March 17, 1970   E. A. KNAPP ET AL   3,501,734
METHOD AND DEVICE FOR STABILIZATION OF THE FIELD DISTRIBUTION
IN DRIFT TUBE LINAC
Filed Sept. 7, 1967   3 Sheets-Sheet 1

INVENTOR.
Edward A. Knapp, James M. Potter,
Donald A. Swenson
BY

March 17, 1970 E. A. KNAPP ET AL 3,501,734
METHOD AND DEVICE FOR STABILIZATION OF THE FIELD DISTRIBUTION
IN DRIFT TUBE LINAC
Filed Sept. 7, 1967 3 Sheets-Sheet 2

INVENTOR.
Edward A. Knapp, James M. Potter,
Donald A. Swenson
BY

INVENTOR.
Edward A. Knapp, James M. Potter,
Donald A. Swenson

United States Patent Office 3,501,734
Patented Mar. 17, 1970

3,501,734
METHOD AND DEVICE FOR STABILIZATION OF THE FIELD DISTRIBUTION IN DRIFT TUBE LINAC
Edward A. Knapp, Donald A. Swenson, and James M. Potter, Los Alamos, N. Mex., assignors to the United States of America as represented by the United States Atomic Energy Commission
Filed Sept. 7, 1967, Ser. No. 666,564
Int. Cl. H01j 23/00; H05h 9/00
U.S. Cl. 328—233     4 Claims

ABSTRACT OF THE DISCLOSURE

Resonant couplers for stabilization of the field distribution in drift tube linacs, said coupler configurations ranging from a tunable T-bar shaped device to a simple post mounted normally to the outer wall of the linac cavity, and a method of achieving stabilization, are described.

---

The invention described herein was made in the course of, or under, Contract W-7405-ENG-36 with the U.S. Atomic Energy Commission.

Proton linear accelerators of the drift tube type, also known as a linac, generally operate in the "0," or what is sometimes referred to as the "$2\pi$" cavity mode. It has long been known in the art that this particular cavity mode, while producing the desired field distribution, is susceptible to perturbations in electric field E distributions due to machinal deformation or beam loading. These perturbations are primarily due to poor energy propagation characteristics of the chosen mode. The inventors have found that by modifying the "0-mode" drift tube linac by the addition of resonant couplers of suitable geometry a stabilization is achieved having the properties of a $\pi/2$ cavity mode.

In order to further define the terms and describe a typical linac, we are incorporating the following articles by reference:

(1) L. W. Alvarez, et al.: "Berkeley Proton Linear Accelerator," Rev. Sci. Inst. 26, 111–133 (1965).

(2) D. E. Nagle: "Coupled Resonator Model of Linear Accelerator Tanks," 1964 Linear Accelerator Conference July 20–24, 1964 MURA–714, p. 21.

(3) E. A. Knapp: "800 Mc R.F. Structures," 1964 Linear Accelerator Conference, July 20–24, 1964 MURA–714, p. 31.

(4) E. A. Knapp: "Design, Construction and Testing of R.F. Structures for a Proton Linear Accelerator," IEEE Transactions on Nuclear Science, vol. NS–12, No. 3, June 1965, p. 118.

(5) B. C. Knapp, E. A. Knapp, G. J. Lucas and J. M. Potter: "Resonantly Coupled Accelerating Structures for High Current Proton Linacs," IEEE Transactions on Nuclear Science, vol. NS–12, No. 3, June 1965, p. 159.

(6) E. A. Knapp, P. W. Allison, C. R. Emigh, L. N. Engel, J. M. Potter and W. J. Shlaer: "Accelerating Structure Research at Los Alamos," Proceedings of the 1966 Linear Accelerator Conference, Oct. 3–7, 1966, LA–3609, p. 83.

(7) D. E. Nagle, E. A. Knapp and B. C. Knapp: "A Coupled Resonator Model for Standing Wave Accelerator Tanks," published in the Review of Scientific Instruments 38, 1583, (1967).

The inventors have achieved the stability properties of the $\pi/2$ mode by introducing resonant couplers of a suitable geometry to the side of the linac cavity, said coupler configurations ranging from a "T-bar" shaped device to a simple post mounted on the cavity wall. The tuning of the coupler can be accomplished by moving in or out, normal to the cavity wall. Any means of support for the coupler which facilitates the controlled adjustment of the penetration of the coupler into the cavity while maintaining electrical contact between the coupler and the cavity wall will work. Further details of the coupler support and adjustment mechanisms are not intended as part of this invention.

In order to better understand what is meant by a $\pi/2$ mode system, a brief discussion of coupled resonator modes is hereafter described.

CLASSIFICATION OF COUPLED RESONATOR MODES

A general chain of N coupled resonators has N possible modes of oscillation for any one set of individual resonator single cavity resonant field distributions. It may be shown that the chain of resonators does not need to be periodic, or even doubly periodic, for these modes to exist, and that so long as energy can couple from resonator to resonator the modes excited in adjacent cavities need not have similar spatial characteristics at all. We make use of these results to describe the synthesis of our $\pi/2$-mode system.

Consider a chain of generalized resonators as shown below.

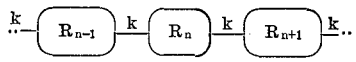

If these cavities all resonate at the same frequency, and there are an odd number of resonators, there will exist a resonant mode of the system with alternate cavities unexcited except for a small field to allow power transmission, and a phase shift in the fields *driving* the unexcited resonator of $\pi$ radians, as shown below.

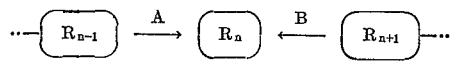

Drive to $R_n$ from $R_{n-1}$ (A)=—drive to $R_n$ from $R_{n+1}$. Thus for a chain of coupled resonators to be consistent with this description, the $\pi/2$ mode is that set of field distributions which provides equal but opposite drives to alternate unexcited cavities. By proper choice of cavity configuration the ordinary mode of the drift tube linac may be converted into this mode.

It is therefore the principal object of the present invention to provide a novel resonant coupler which stabilizes the field distribution in a drift tube linac.

Another feature of the present invention is to provide a method of achieving stabilization of the field distribution in a drift tube type linac.

These and other features and advantages of the present invention will be more apparent after a perusal of the following specification taken in connection with the accompanying drawings wherein.

Figure 1:
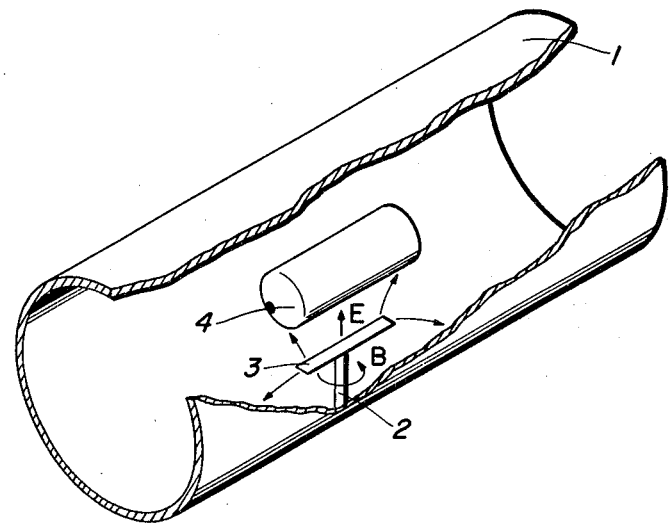
FIGURE 1 is a partial sectional view of a T-bar coupler contained within a section of a drift tube type linac.

Referring now to FIG. 1, there is shown a drift tube linac cavity 1 with a drift tube 4 below which is mounted a T-bar coupler having a stem 2 and a capacitance plate 3.

Figure 2:
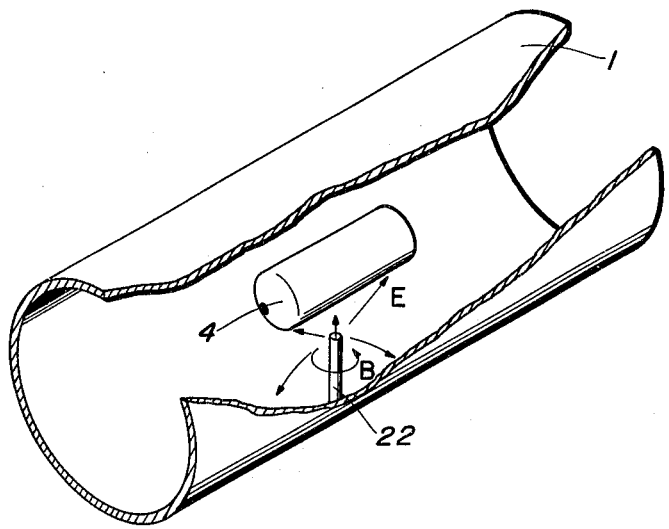
FIGURE 2 is a partial sectional view of a post coupler contained within a section of a drift tube type linac.

FIGURE 2 shows the same cavity 1 with drift tube 4; however, instead of a T-bar coupler, a pose coupler 22 has been substituted therefor.

Figure 3:
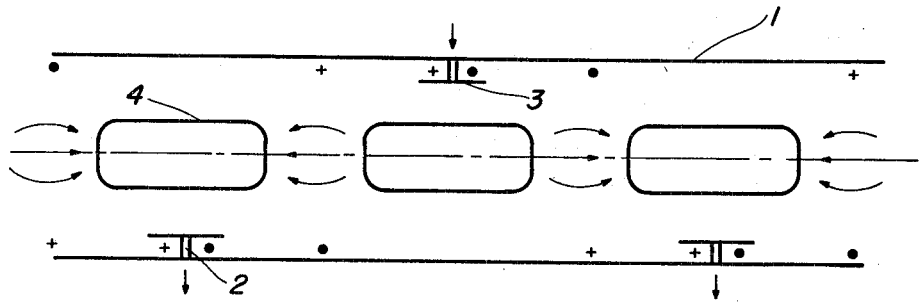
FIGURE 3 is a schematic diagram of a drift tube type linac in the "0" mode.
Figure 4:
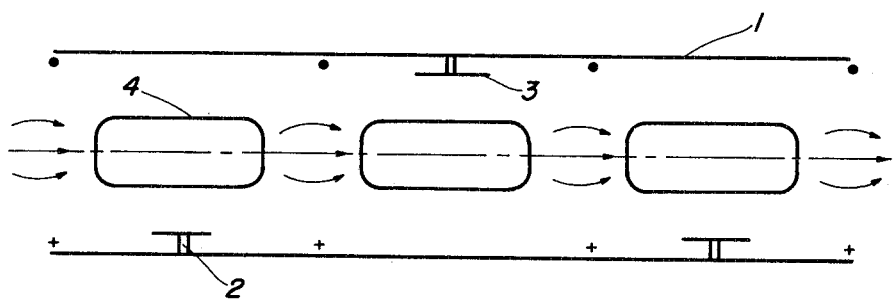
FIGURE 4 is a schematic diagram of a drift tube type linac in the "$\pi/2$" mode.
Figure 5:
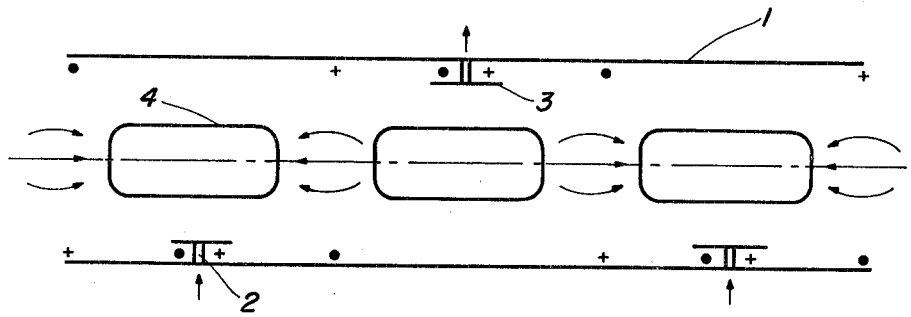
FIGURE 5 is a schematic diagram of a drift tube linac in the "$\pi$" mode.

FIGURES 3, 4, and 5 are schematic drawings in which the cavity 1, a T-bar coupler mounted on opposite sides of said cavity and normal to the drift tube 4, said coupler having a post 2 and a capacitance plate 3, are shown.

THE RESONANT COUPLERS

There is at least one family of resonant couplers that have the desired properties. The distinctive feature of this family is an inductive stem mounted normal to the outer wall of the linac cavity. The "T-bar" coupler (see FIG. 1) represents one end of this family, where the inductive stem is short and capped with a plate to increase the capacity of the end of the stem to the cavity wall and drift tube. The "post" coupler (see FIG. 2) represents the other end of the family, where the inductive stem is long and the capacity of the resonant circuit is just the capacity of the end of the stem to the drift tube and cavity wall. In either case, the resonance considered is the one where currents oscillate up and down the stem charging and discharging the end of the stem with respect to the cavity wall and drift tube.

The most favorable location for these couplers is at the points on the outer wall of the linac cavity that are aligned with the centers of the drift tubes and oriented ±90° from the drift tube stems. If the latter are in the vertical plane, the couplers would be in the horizontal plane. Furthermore, the nature of the coupling between adjacent resonant couplers is such that adjacent couplers must be located on opposite sides of the cavity as shown in FIGS. 3–5.

THE LINAC MODES

Consider the drift tube linac cavity as a chain of $2N+1$ coupled resonantors number from 0 to 2N, where the even numbered resonators correspond to the accelerating cavities and the odd numbered resonators correspond to the resonant couplers. In order to determine the field directions corresponding to a mode with a phase shift per cell of $\varphi$, it is necessary to inject the concept of an additional phase shift of $\pm \pi$ associated with the geometry of the resonant coupling device. The 0 and $\pi$ modes, as shown in FIGS. 3 and 5, have electric E and magnetic B fields that alternate in direction in adjacent accelerating cells. In the case shown, the 0-mode has a lower frequency than the $\pi$-mode, and by convention, we define the field direction in the coupler to correspond to this classification. The arrows near the couplers show the relative directions of the currents on the stems in each mode. In the $\pi/2$-mode, the fields have the same phase in all accelerating cavities, opposite from adjacent cells, and the couplers are unexcited. Hence the original drift tube mode has been transformed into the $\pi/2$-mode of the composite system.

STABILITY OF ELECTRIC FIELD DISTRIBUTORS

Figure 6:
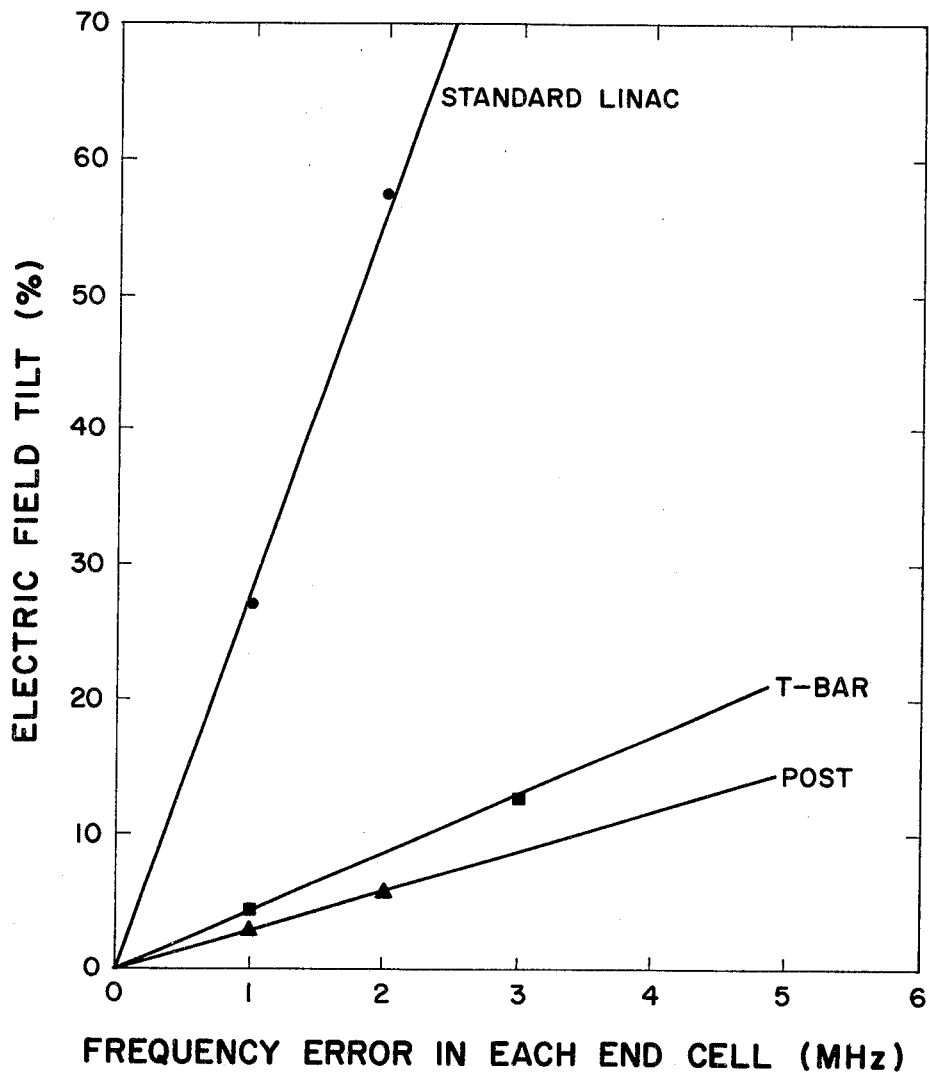
FIGURE 6 is a plot of the stability using the couplers of this invention versus no coupler.

The bead perturbation technique was used to measure the electric field distributions in the 10-cell cavity fitted with the T-bar couplers, post couplers, and finally no couplers. The absolute field distributions are not too meaningful, for as in the side-coupled cavity chain case, crude manufacture of couplers introduces coupling constant errors which cause a non-flat field in the tuned up case. However, the stability of the existing field distributions to programmed errors in the end cells is meaningful and the results of measurements of this type are shown in FIG. 6.

A tank "tilt" is defined as the difference between the electric fields in the end cells divided by the average of the fields of the end cells. The field stability is then quoted as the percentage change in tank tilt when the resonant frequency of one end cell is raised a certain amount and the resonant frequency of the other end cell is lowered by the same amount. An "improvement factor" is also defined for the field stability as the percentage change in tank tilt for the nonresonantly coupled structure divided by the change in tank tilt for the reasonantly coupled structure. A drift tube tank is defined as "flat" when the average axial electric field $E_0$ in each cell is the same.

Improvements in stability of the order to 5–10 are demonstrated for the T-bar and post configurations. The coupled resonator theory would predict the improvement in stability to be inversely proportional to the stopband. With care in adjusting the individual couplers, one may expect even greater stability than that shown in FIG. 6. In fact, experiments have shown that the field tilts reverse for a fixed perturbation when the resonant frequencies of the couplers go from below to above the frequency required to close the stopband in the mode spectrum.

With tuning the T-bar couplers in the 10-cell linac an improvement in field stability of a factor of five was produced. That is, with the couplers installed, the tank tilt changed 5% for end-cell perturbations of ±1mHz. Without the resonant couplers, the tank tilt changed 25% for the same end-cell frequency perturbations. The Q of the tank with the couplers was 17,200 as compared to 21,000 for the same tank without the couplers.

The 10-cell model was then fitted with ⅜-in. diam. post couplers. An improvement in field stability of a factor of seven was realized, and the Q of the configuration was 18,900. For this particular setting of the posts, the resonant frequencies of the posts were lower than required to close the stopband in the mode spectrum, and the direction of tilt was the same as that without the posts.

ADJUSTMENT OF ELECTRIC FIELD DISTRIBUTIONS

In the case where the stopband is perfectly closed, the field distributions may differ from the desired distribution as a result of the variable cell length and other perturbation such as frequency tuners, drive loops, vacuum ports, etc. Due to the extreme stability of the fields, it is impractical to attempt to change this field distribution by tuning the main accelerating cells. On the other hand, it is reasonable to expect the field distribution to be sensitive to eccentricities in the coupler geometry.

An eccentric coupler was installed in a 2-half cell cavity and the field distribution was measured. The coupler consisted of a T-bar coupler with the 2 in. x 6 in. plate offset by half an inch, making the arms of the T 2½ in. and 3½ in., respectively. The resulting fields were 15% higher in the cell adjacent to the shorter arm than in the other cell.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense. In particular, a family of resonant couplers has been described which produces $\pi/2$-mode operation in a drift tube linac structure. Furthermore, the coupler is tunable, has no mechanical interaction with the drift tube, and requires little additional power dissipation for successful operation. With the couplers of this invention installed and tuned in a drift tube tank, an improvement of greater than a factor of 200 has been obtained in the sensitivity to tank tilt with end-cell frequency change. The tank is also much less sensitive to beam loading effects than the conventional drift tube tank.

What is claimed is:
1. A method for stabilizing the electric field distribution in a drift tube linac utilizing an electrically conducting metal coupler mounted to the cavity wall of the accelerator, said coupler being positioned so that it is aligned with the center of the drift tube and oriented

±90° from the drift tube stem with adjacent couplers being located on opposite sides of the cavity wall, and tuning for maximum field stability, said tuning comprising the adjustment of the penetration of said couplers into the cavity while maintaining electrical contact between the couplers and the cavity wall.

2. A device for stabilizing the electric E field distribution in a drift tube linac comprising a resonant metal coupler, said coupler being an inductive metal stem mounted normal to the cylindrical wall of the linac cavity and made of any conducting metal.

3. The device of claim 2 in which the said coupler is a T-bar, the stem being approximately 2 inches long and the arms of the T being 6 inches in length.

4. The device of claim 2 in which the said metal coupler is a post.

References Cited

UNITED STATES PATENTS

| | | | |
|---|---|---|---|
| 2,600,278 | 6/1952 | Smullin | 333—83 |
| 2,639,326 | 5/1953 | Ring | 178—44 |
| 2,940,000 | 6/1960 | Geisler | 315—5.41 |
| 2,945,155 | 7/1960 | Chodorow | 315—5.39 |
| 3,124,714 | 3/1964 | Bendorf | 315—5.39 |
| 3,137,828 | 6/1964 | Gerig et al. | 333—83 X |
| 3,296,519 | 1/1967 | Kaufman et al. | 333—76 X |
| 3,387,171 | 6/1968 | Heil | 315—5.39 X |

JAMES W. LAWRENCE, Primary Examiner

D. O'REILLY, Assistant Examiner

U.S. Cl. X.R.

333—83; 315—5.41